United States Patent
Kulenkampff et al.

(10) Patent No.: US 8,961,143 B2
(45) Date of Patent: Feb. 24, 2015

(54) ROTOR BLADE OF A WIND POWER PLANT AND METHOD FOR FABRICATING A ROTOR BLADE OF A WIND POWER PLANT

(75) Inventors: Jens Kulenkampff, Kiel (DE); Claus Weegen, Jever (DE); Mario Kontis, Kiel (DE)

(73) Assignee: Repower Systems AG, Hamburg (DE)

( * ) Notice: Subject to any disclaimer, the term of this patent is extended or adjusted under 35 U.S.C. 154(b) by 525 days.

(21) Appl. No.: 13/383,012

(22) PCT Filed: Jun. 15, 2010

(86) PCT No.: PCT/EP2010/003585
§ 371 (c)(1),
(2), (4) Date: Jan. 9, 2012

(87) PCT Pub. No.: WO2011/006563
PCT Pub. Date: Jan. 20, 2011

(65) Prior Publication Data
US 2012/0107129 A1    May 3, 2012

(30) Foreign Application Priority Data
Jul. 13, 2009    (DE) .......................... 10 2009 033 164

(51) Int. Cl.
*F03D 1/06*    (2006.01)
*B23P 15/04*    (2006.01)
(Continued)

(52) U.S. Cl.
CPC .............. *B29C 65/7847* (2013.01); *B29C 65/52* (2013.01); *B29C 65/7838* (2013.01); *B29C 66/1142* (2013.01); *B29C 66/54* (2013.01); *B29C 66/721* (2013.01); *B29D 99/0028* (2013.01); *F03D 1/0675* (2013.01); *B29C 66/324* (2013.01); *B29C 66/543* (2013.01);
(Continued)

(58) Field of Classification Search
CPC ..... F03D 1/0675; B29C 65/52; B29C 66/324; B29C 65/7838; B29C 65/7847; B29C 66/1142; B29C 66/54; B29C 66/721
USPC ............ 416/224, 226, 229 R, 230; 29/889.71
See application file for complete search history.

(56) References Cited

U.S. PATENT DOCUMENTS

| 4,732,542 A | 3/1988 | Hahn et al. | |
|---|---|---|---|
| 7,179,059 B2 * | 2/2007 | Sorensen et al. | 416/226 |

(Continued)

FOREIGN PATENT DOCUMENTS

| DE | 3113079 | 10/1982 |
|---|---|---|
| DE | 102008038620 | 12/2009 |

(Continued)

*Primary Examiner* — Igor Kershteyn
(74) *Attorney, Agent, or Firm* — Rankin, Hill & Clark LLP (57) ABSTRACT

A rotor blade of a wind power plant in which the rotor blade has a longitudinal extension that extends from a rotor blade root substantially to a rotor blade tip. At least in one region of the rotor blade, an aerodynamic cross-sectional profile is provided, which has a leading edge (nose) and a trailing edge, which are connected via a suction side and a pressure side of the cross-sectional profile. The rotor blade is subdivided at least in a longitudinally extended section into a front rotor blade section with the leading edge and a rear rotor blade section with the trailing edge. The rear region of the front rotor blade section and the adjacent front region of the rear rotor blade section are connected through an I-beam.

14 Claims, 9 Drawing Sheets

(51) Int. Cl.
  *B29C 65/78* (2006.01)
  *B29C 65/52* (2006.01)
  *B29C 65/00* (2006.01)
  *B29D 99/00* (2010.01)
  *B29C 65/48* (2006.01)
  *B29C 65/54* (2006.01)
  *B29K 63/00* (2006.01)
  *B29K 307/00* (2006.01)
  *B29K 309/08* (2006.01)
  *B29L 31/08* (2006.01)

(52) U.S. Cl.
  CPC ............... *B29C 65/48* (2013.01); *B29C 65/544* (2013.01); *B29K 2063/00* (2013.01); *B29K 2277/10* (2013.01); *B29K 2307/00* (2013.01); *B29K 2309/08* (2013.01); *B29L 2031/082* (2013.01); *B29L 2031/085* (2013.01); *Y02E 10/721* (2013.01)
  USPC ........ 416/224; 416/226; 416/229 R; 416/230; 29/889.71

(56) References Cited

U.S. PATENT DOCUMENTS

| | | | |
|---|---|---|---|
| 7,798,780 B2 * | 9/2010 | Bakhuis et al. | 416/223 R |
| 8,012,299 B2 * | 9/2011 | Hancock | 416/132 B |
| 8,075,275 B2 * | 12/2011 | Althoff et al. | 416/226 |
| 8,556,590 B2 * | 10/2013 | Esaki et al. | 416/226 |
| 2009/0070977 A1 | 3/2009 | Livingston et al. | |
| 2009/0162208 A1 | 6/2009 | Zirin et al. | |

FOREIGN PATENT DOCUMENTS

| | | |
|---|---|---|
| DE | 102008045578 | 12/2009 |
| EP | 1965074 | 9/2008 |
| GB | 458312 | 12/1936 |
| WO | 95/20104 | 7/1995 |
| WO | 01/46582 | 6/2001 |
| WO | 03/093672 | 11/2003 |

* cited by examiner

ROTOR BLADE OF A WIND POWER PLANT AND METHOD FOR FABRICATING A ROTOR BLADE OF A WIND POWER PLANT

BACKGROUND OF THE INVENTION

1. Field of the Invention

The invention relates to a rotor blade of a wind power plant, wherein the rotor blade has a longitudinal extension, which extends from a rotor blade root substantially to a rotor blade tip, wherein, at least in one region of the rotor blade, an aerodynamic cross-sectional profile is provided, which has a leading edge (nose) and a trailing edge, which are connected via a suction side and a pressure side of the cross-sectional profile.

Furthermore, the invention relates to a method for fabricating a corresponding rotor blade. Moreover, the invention relates to a method for producing a belt pair of a rotor blade and a fabrication mold for the production of a belt pair for use in a rotor blade.

2. Description of Related Art

Rotor blades for wind power plants are normally built in two shells, namely one shell on the suction side of the rotor blade and one shell on the pressure side of the rotor blade, and adhered together. Two webs or spars, which are adhered to the belt for the suction side and to the belt for the pressure side and ensure buckling safety in the blade, are usually located between the shells. The belts provide in particular for the torsional or bending stiffness of the rotor blade and represent, in combination with the webs or respectively spars, the support structure of the rotor blade.

In particular in the case of large rotor blades, the production of the rotor blades is time-consuming and expensive. For this reason, such large rotor blades are produced in several parts as just two shells and then adhered. The individual parts hereby become smaller, whereby the production time and the costs from potential production errors are reduced. For example, refer to DE 31 13 079 A1 and EP 1 965 074 A2.

Also, reference is made to WO 03/093672 A1, which discloses a rotor blade for wind power plants with a shell, the airfoil cross-section of which is reinforced against bending in the flapwise direction through belts provided pairwise and opposite the airfoil chord of the rotor blade and through webs between them, wherein the belts consist of plastic fiber reinforced in the longitudinal direction and have a glass fiber and a carbon fiber reinforced section in the longitudinal direction.

BRIEF SUMMARY OF THE INVENTION

The object of the present invention is to provide for a rotor blade that is to be produced simply and precisely as well as cost-effectively, a corresponding method for fabricating said rotor blade as well as an efficient method for producing a belt pair and a corresponding fabrication mold for the production of a belt pair for use in a corresponding rotor blade.

The object is achieved through a rotor blade of a wind power plant, wherein the rotor blade has a longitudinal extension, which extends from a rotor blade root substantially to a rotor blade tip, wherein, at least in one region of the rotor blade, an aerodynamic cross-sectional profile is provided, which has a leading edge (nose) and a trailing edge, which are connected via a suction side and a pressure side of the cross-sectional profile, which is further formed in that the rotor blade is subdivided at least in a longitudinally extended section into a front rotor blade section with the leading edge and a rear rotor blade section with the trailing edge, wherein the rear region of the front rotor blade section and the adjacent front region of the rear rotor blade section are connected by an I-beam.

By providing an I-beam, which can also be called a double-T beam within the framework of the invention, a very efficient and cost-effective production of a corresponding rotor blade is possible. The rotor blade can hereby be prefabricated in two halves and the connection, in particular adhering of adjacent webs, which extend from a suction side to a pressure side and which are in particular connected with respective belts to an I-beam, contribute to a high stability. It was hereby surprisingly determined that one component, which contributes to the stabilization or respectively strength of the rotor blade and, as an important component, has a load-bearing function, can first be split in the fabrication of the rotor blade and, through corresponding connection of the parts of the load-bearing structure, in particular adhering, a still sufficient stability or respectively preferably even increased stability is generated.

The longitudinal extension, which extends from the rotor blade root substantially to a rotor blade tip, means in particular that the longitudinal extension does not have to be present exactly up to the rotor blade tip; it can also be offset at an angle so that the longitudinal extension from the rotor blade root lies at an angle to a longitudinal extension, which would go to the rotor blade tip. The angle can hereby lie, for example, between −5° and 5°. The angle can also be so large that, in the case of a rotor blade fabrication, in which a prefabricated rotor blade tip with an extension in the longitudinal direction of up to 5 m is attached to the rest of the partial span, for example the longitudinal extension to the trailing edge or leading edge can lie on the seam at the joining edge of the partial span to the rotor blade tip. It is particularly preferred if in the longitudinal extension from the rotor blade root to the rotor blade tip a shift towards the leading edge or trailing edge of the rotor blade of 200 mm to 300 mm from the rotor blade tip is provided so that a corresponding angle of the longitudinal extension to an imaginary longitudinal extension from the rotor blade root to the rotor blade tip results.

The I-beam preferably has a web, which extends from the pressure side to the suction side within the rotor blade, and also a belt on the pressure side as well as a belt on the suction side. The belt is hereby preferably inserted within the rotor blade and is connected with an outer lying shell.

The web preferably comprises web feet, which form with the web the shape of a square bracket or the shape of a Z.

A particularly simple and efficient fabrication is given when the I-beam is divided in the longitudinal extension. The I beam parts are preferably connected with each other, in particular adhered. The I-beam preferably has I-beam parts, which comprise a web, wherein the I-beam is divided in longitudinal extension and two-dimensionally, in particular in a plane, which is defined by the web. The web is hereby a substantially two-dimensional component, wherein the plane of the division passes right through the web, substantially parallel to the lateral surfaces of the web. Through the adhesion, which can in particular also be realized using glass fibers, and is realized for example with a plastics technique using at least one resin and at least one fiber layer, in particular glass fibers and/or carbon fibers and/or aramid fibers, an adhesion, for example with a transfer molding technique, an infusion technique or a vacuum-supported infusion technique, can occur.

If two belts each close the I-beam preferably towards the suction side and towards the pressure side, which have a distance from each other, which is smaller than the extension of the belts in the direction from the leading edge to the trailing edge of the rotor blade, a particularly stable construction of the rotor blade is possible.

The spaced belts are preferably connected on the suction side and/or on the pressure side through adhesion, each with one web foot of the web. The web foot then has a corresponding extension in the chord direction between the leading edge and the trailing edge or respectively an almost tangential extension to the airfoil in the area of the web, which enables a sufficient rigid or respectively stable connection of the belts both on the pressure side as well as on the suction side.

The rotor blade is preferably divided in particular during the production additionally at the leading edge and/or the trailing edge. This results in an even more simple and exact fabrication option for the rotor blade. For a corresponding fabrication method and a corresponding fabrication mold, which enables this, we refer in full to the patent application of the patent applicant from Aug. 12, 2008 with the title "Verfahren and Fertigungsform zur Fertigung eines Rotorblatts für eine Windenergieanlage", with file reference DE 10 2008 038 620.0.

Another solution of the object is a rotor blade of a wind power plant, wherein the rotor blade has a longitudinal extension, which extends from a rotor blade root substantially to a rotor blade tip, wherein, at least in one region of the rotor blade, an aerodynamic cross-sectional profile is provided, which has a leading edge (nose) and a trailing edge, which are connected via a suction side and a pressure side of the cross-sectional profile, which is further formed in that a belt divided in the longitudinal extension of the rotor blade is provided, the belt parts of which have a distance from each other, which is smaller than the extension of a belt part in the direction from the leading edge to the trailing edge. The distance of the belts in the chord direction of the airfoil is thus smaller than the width of a belt part.

The divided belt hereby has substantially the contour of the rotor blade in the area, in which the belt is arranged in the rotor blade, i.e. the divided belt is accordingly curved and twisted in the longitudinally axial direction, wherein the twist represents, in particular, a type of wringing around the longitudinal axis or respectively around the longitudinal extension and the curvature is, in particular, a type of bending of the rotor blade toward the longitudinal axis. The divided belt is thus correspondingly preferably "flexed" and "twisted."

The division of the belt should be understood in particular such that a corresponding distance is provided from the rotor blade leading edge to the rotor blade trailing edge. Alternatively, the divided belt can also be understood as two belts arranged next to each other, the distance of which is comparatively small. The divided belt can thus also be two belts arranged next to each other, which are designed in particular such that they withstand the load of a normally used single belt. Using a divided belt or respectively two belts arranged next to each other, the fabrication accuracy of rotor blades, which consist in the longitudinal extension of two parts or respectively rotor blade sections or respectively comprise them, is particularly high.

The distance is preferably less than ½, in particular preferably less than ¼ of the extension of a belt part or respectively of a belt in the direction from the leading edge to the trailing edge of the rotor blade. The divided belt is preferably substantially provided over the entire longitudinal extension of the rotor blade.

A web, which extends from the suction side to the pressure side of the rotor blade, is preferably connected, in particular adhered, with the belt parts so that the web forms an I-beam with the belt parts. A particularly stable rotor blade is hereby possible.

The object is further achieved through a method for fabricating a rotor blade of a wind power plant, wherein the fabricated rotor blade in its longitudinal extension, which extends from a rotor blade root substantially to a rotor blade tip, has at least one region, in which the rotor blade has an aerodynamic cross-sectional profile, which has a leading edge (nose) and a trailing edge, which are connected via a suction side and a pressure side of the cross-sectional profile, with the following method steps:

Providing at least two rotor blade sections fabricated and divided in the longitudinal direction of the rotor blade, wherein the division is arranged between the leading edge and the trailing edge, Applying or inserting of a first web part extending substantially from the pressure side to the suction side into a first divided rotor blade section and a second web part extending substantially from the pressure side to the suction side into a second divided rotor blade section and Connecting, in particular adhesion of, the first web part with the second web part so that a double web forms.

The stability of the web is already increased through the establishment of a double web. The application or insertion of a first web part extending substantially from the pressure side to the suction side into a first divided rotor blade section and a second web part extending substantially from the pressure side to the suction side into a second divided rotor blade section includes the application or insertion of these respective web parts into the inside of the rotor blade sections so that they are attached to the inner wall of the rotor blade sections or respectively of a belt arranged there. The understanding of application or insertion also includes attachment.

The application or insertion of the first and the second web part preferably comprises a connection, in particular adhesion, of the first and second web part, each to one belt on the pressure side and one belt on the suction side per rotor blade section.

Through the connection, in particular adhesion, of the first, in particular square-bracket-shaped, web part with the second, in particular square-bracket-shaped, web part, an I-beam preferably forms, comprising at least four belts and a double web. It is hereby particularly simple to connect the two rotor blade sections with each other so that a very stable structure results.

According to the invention, a method for fabricating a rotor blade of a wind power plant is provided, wherein the fabricated rotor blade in its longitudinal extension, which extends from a rotor blade root substantially to a rotor blade tip, has at least one region, in which the rotor blade has an aerodynamic cross-sectional profile, which has a leading edge (nose) and a trailing edge, which are connected via a suction side and a pressure side of the cross-sectional profile, wherein the following method steps are provided:

Providing at least two rotor blade sections fabricated and divided in the longitudinal direction of the rotor blade, wherein the division is arranged between the leading edge and the trailing edge, Applying or inserting a web extending substantially from the pressure side to the suction side, which has at least two web feet, into a first divided rotor blade section so that a part of the web feet protrudes out of the rotor blade section:

Connecting, in particular adhesion of, the protruding parts of the web feet with a second divided rotor blade section.

An I-beam, comprising four belts and the web, preferably forms through the connection, in particular adhesion, of the web with the rotor blade sections. The terms application or insertion can also include an attachment.

During the production of the rotor blade, preferably a rotor blade tip area and/or a rotor blade root can be provided as prefabricated insert, each of which do not necessarily have to be divided in the longitudinal extension. The longitudinal extension of these prefabricated insert parts can extend from a few centimeters up to 5 m.

Preferably, one suction side section and one pressure side section are connected, in particular adhered, with each other at least for one rotor blade section for the provision of two rotor blade sections fabricated and divided in the longitudinal extension of the rotor blade.

The two rotor blade sections preferably form a nose box and/or an end box of a rotor blade.

Preferably, one belt is respectively connected, in particular adhered, to a suction side and a pressure side of each rotor blade section for the provision of two rotor blade sections fabricated and divided in the longitudinal extension of the rotor blade.

The method according to the invention and the further developments of the method according to the invention are preferably carried out in a joining device, which is designed to hold the rotor blade sections or respectively suction side sections and pressure side sections as well as webs and the like with corresponding holding devices. Alternatively, these components can also still be at least partially arranged or respectively held in a fabrication mold. A corresponding fabrication mold is disclosed in the aforementioned German patent application DE 10 2008 038 620.0.

The object is further achieved through a method for producing a belt pair of a rotor blade of a wind power plant, in particular for the production of a rotor blade according to the invention, wherein the belt pair is produced in a fabrication mold, which has the contour of the rotor blade in the area of the belt pair and extends at least over the length of a section of the rotor blade, in particular in the longitudinal extension.

It is hereby possible to produce very precisely a belt pair for use in a rotor blade, which is arranged in the one hand on the suction side and/or on the pressure side of the rotor blade and serves in particular to connect shell segments or respectively rotor blade sections or suction side and pressure side sections with the belt pair so that a very exact fabrication of a rotor blade fabricated with it is possible. In particular, a very high joint accuracy or respectively connection accuracy can be established by adhering to a preferably constant distance between the belt pair over the length of the section, in particular of the aerodynamic region, of the rotor blade and preferably from the blade root up to the blade tip or substantially from the blade root substantially up to the blade tip.

The section preferably extends from a region near the rotor blade root up to the rotor blade tip or up to a section end of the rotor blade near the rotor blade tip. In particular, in the last variant with the extension up to a section end of the rotor blade near the rotor blade tip, a fabrication of the rotor blade is hereby provided, in which a prefabricated rotor blade tip is attached to a longitudinally extending, divided rotor blade section. For this, the belt pair is then adjusted according to the section length of the divided rotor blade sections, namely in the longitudinal extension of the divided rotor blade sections. The prefabricated rotor blade tip section or respectively the prefabricated rotor blade tip can hereby have a length of a few centimeters up to several meters, in particular of up to 5 m.

An intermediate web, in particular middle web, is preferably provided in the fabrication mold, which is designed either as a single piece with the fabrication mold as intermediate web, in particular middle web, or as a removable intermediate web, in particular middle web. A constant distance can hereby be achieved very exactly between the belt pairs.

Within the framework of the invention, the term "belt pair" also means two belts, which are produced next to each other in a fabrication mold, or also the term "in the longitudinal direction or respectively longitudinal extension of the rotor blade of the divided belt."

The object is finally achieved through a fabrication mold for the production of a belt pair of a rotor blade of a wind power plant, in particular for use in a rotor blade according to the invention such that the fabrication mold has the contour of the rotor blade in the area of the belt pair on the suction side or the pressure side of the rotor blade and extends at least over the length of a section, in particular of the aerodynamic region, of the rotor blade.

The fabrication mold preferably has an intermediate web, in particular middle web, which is designed either as a single piece with the fabrication mold or as a removable intermediate web, in particular middle web. A recess is preferably provided for the removable intermediate web, in particular middle web. This simplifies the production of the belt pair.

BRIEF DESCRIPTION OF THE DRAWINGS

The invention is described below based on embodiments without restricting the general idea of the invention; explicit reference is made to the figures with regard to all particulars according to the invention not explained in more detail in the text. The drawings show in.

DETAILED DESCRIPTION OF THE INVENTION

In the following figures, the same or similar types of elements or respectively corresponding parts are provided with the same reference numbers so that a corresponding re-introduction can be omitted.

Figure 1:
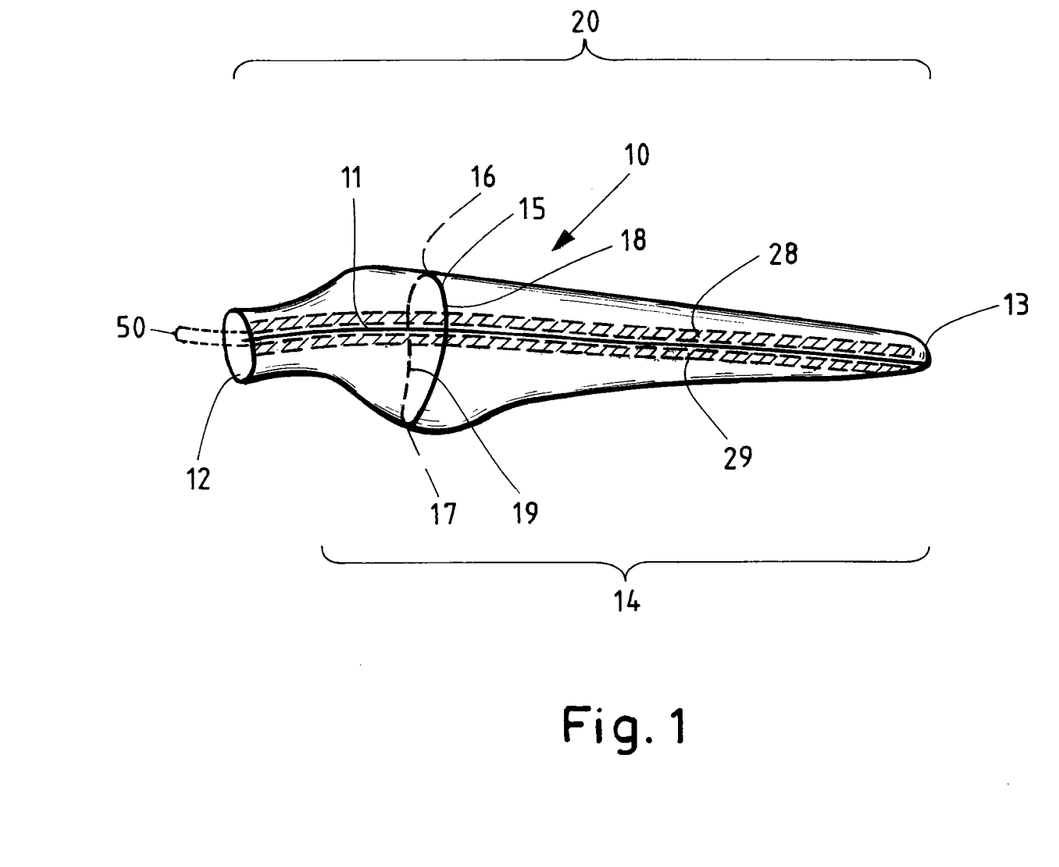
FIG. 1 a schematic representation of a rotor blade of a wind power plant according to the invention, FIG. 2 a schematic representation of corresponding components of a rotor blade in corresponding joining devices in a first step in the fabrication of the rotor blade, FIG. 3 a schematic representation of a state of the fabrication of a rotor blade that is more advanced compared to FIG. 2, FIG. 4 a schematic representation of a state of the rotor blade fabrication that is more advanced compared to FIG. 3, FIG. 5 a schematic representation of a state of the rotor blade fabrication that is more advanced compared to FIG. 4, FIG. 6 a sectional representation of a fabrication mold according to the invention for the production of a belt pair, FIG. 7 a schematic sectional representation of a further production mold according to the invention for the production of a belt pair, FIG. 8 a schematic representation of a rotor blade of a wind power plant according to the invention, FIG. 9 a schematic representation of the fabrication of a rotor blade in an advanced state, FIG. 10 a schematic sectional representation of a part of a fabricated rotor blade according to the invention, FIG. 11 a schematic sectional representation of a part of a fabricated rotor blade according to the invention.

FIG. 1 schematically shows a rotor blade 10 according to the invention, which has a longitudinal extension 11 from a rotor blade root 12 to a rotor blade tip 13. A cross-sectional profile 15, which is aerodynamically active and has a suction side 18 and a pressure side 19, is represented in rotor blade 10. The aerodynamic cross-sectional profile 15 also has a leading edge 16 (nose) and a trailing edge 17.

Furthermore, a belt pair consisting of the belts 28 and 29 is represented schematically, which have a distance 50 from each other and are arranged, for example, on the suction side 18. The belts 28 and 29 are provided in section 20, i.e. in this exemplary embodiment of FIG. 1 from the blade root 12 to the rotor blade tip 13. A corresponding belt pair consisting of the belts 30 and 31 on the pressure side 19 of the rotor blade 10 is not shown. The aerodynamic region 14 of the rotor blade 10 is also sketched, which substantially ensures the lift. The section 20 can also be accordingly shorter, for example end with a specifiable first distance from the rotor blade tip 13 and/or with a specifiable second distance from the rotor blade root 12. The rotor blade 10 can be divided during production in the area of the longitudinal extension 11 shown in FIG. 1. Furthermore, it can also be divided at the leading edge 16 and the trailing edge 17.

Figure 2:
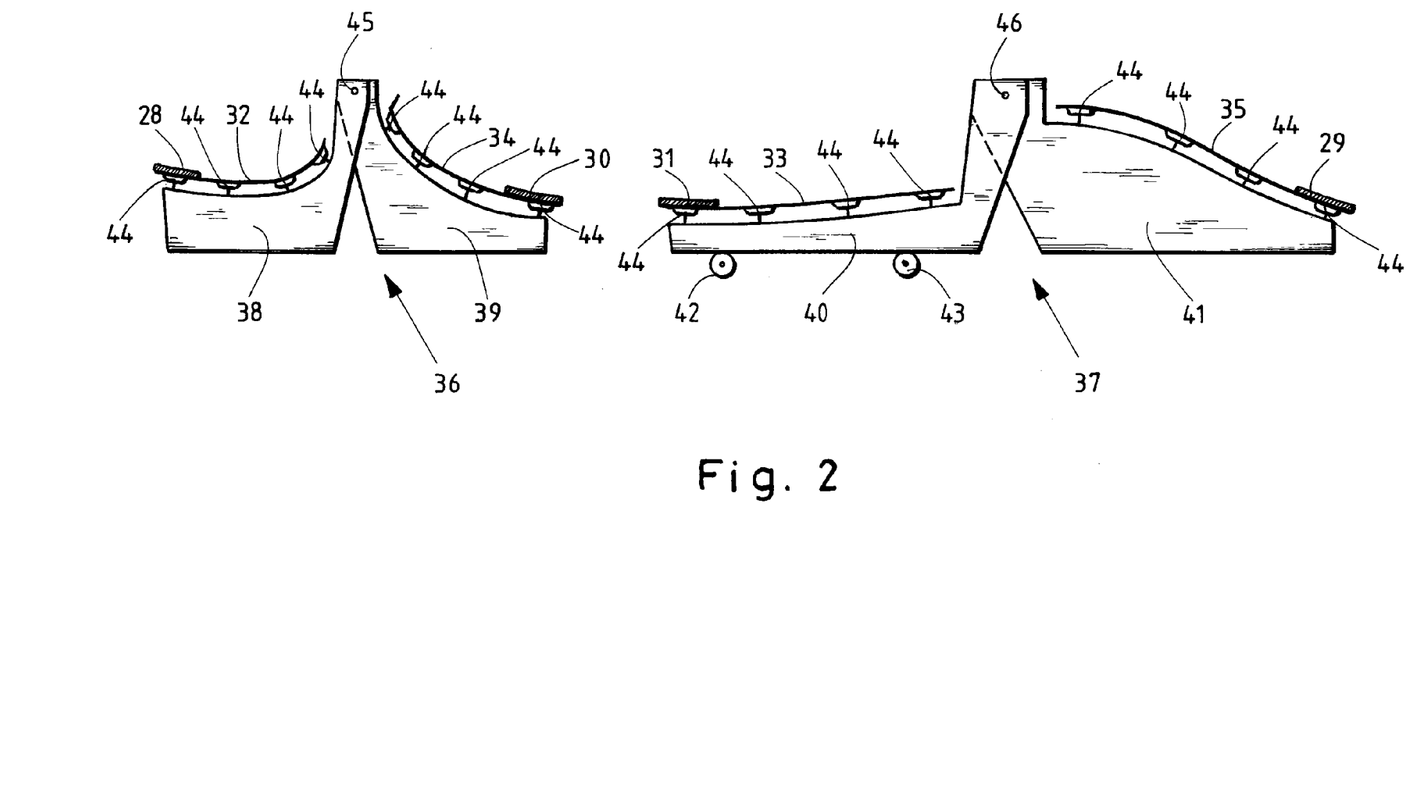

FIG. 2 shows an apparatus for fabricating a rotor blade 10, wherein two joining devices 36 and 37 are provided, onto which shell segments 32, 33, 34, 35 of a rotor blade 10 are held. The shell segment 32 corresponds with a rotor blade shell on the pressure side 19 associated with a leading box or respectively a nose box 21 and the shell segment 34 belongs to the suction side 18 of the leading box or respectively of the nose box 21. Corresponding belts 28 and 30 are connected, in particular adhered, with the shell segments 32 and 34. The adhesion can be realized, for example, with a resin. The shell segments 32 and 34 are fixed by means of a few suction elements 44 using suction air in the joining device 36. The shell segments 33 and 35 are accordingly fixed through suction elements 44 through suction air in the joining device 37.

The shell segment 33 can belong to the suction side of an end box 23 and the shell segment 35 to the pressure side of an end box 22. The shell segments 32 through 35 can be made for example of a glass fiber reinforced fabric with a resin, e.g. epoxy resin. The rotor blade parts are preferably fabricated using a plastics technique. In the plastics technique, a resin and at least one fiber layer, in particular made of glass fibers and/or carbon fibers and/or aramid, such as kevlar fibers in particular, are preferably used. A resin transfer molding (RTM) technique or a resin infusion molding (RIM) technique, in particular a vacuum-assisted resin (VAR) infusion technique and/or a laminating technique, for example with so-called prepregs, can be used for fabrication of the rotor blade shell segments 32-35. The fabrication of the rotor blade shell segments 32-35 is already finished in FIG. 2 so that the fabricated shell segments can be applied onto or respectively inserted into the joining devices 36 and 37.

The belts 28-31 applied on the shell segments or respectively connected or respectively adhered with them can already be connected with the shell segments in the fabrication in a fabrication mold.

The joining devices 36 and 37 each have pivot axes 45 and 46 in order to be able to pivot the pivot parts 38-41.

Figure 3:
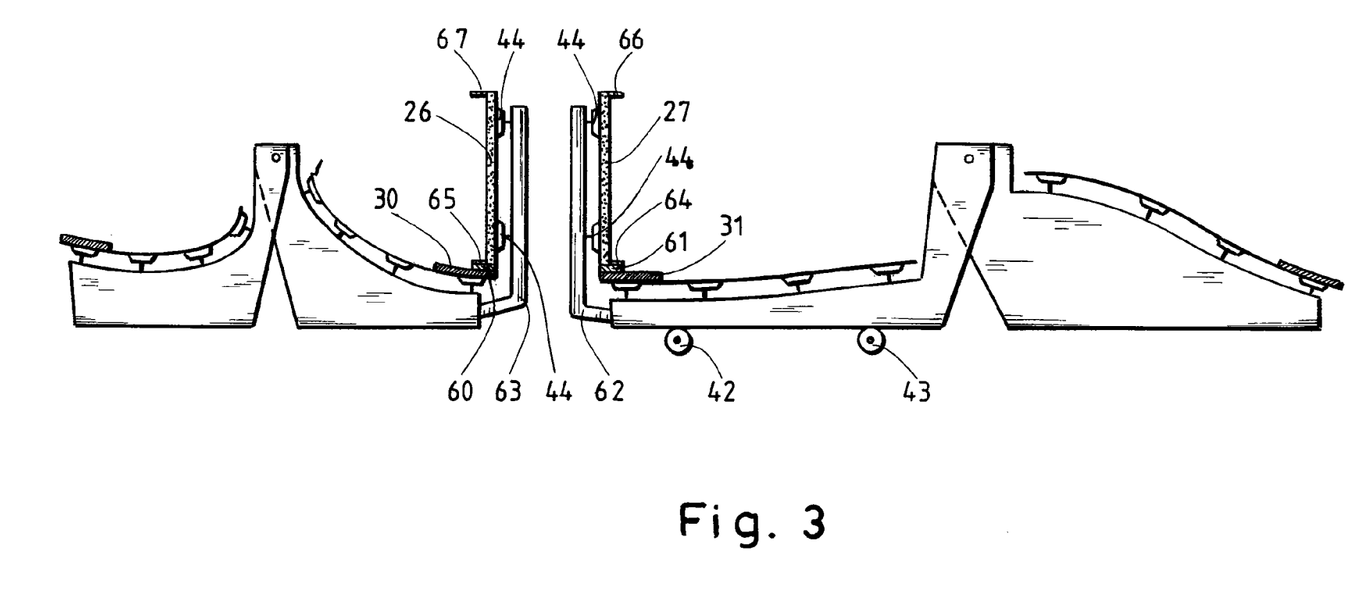

FIG. 3 represents an advanced stage of fabrication of the rotor blade according to the invention. A web part 26 is fixed via suction elements 44 on a positioning device 63 attached precisely to the second pivot part 39 or respectively aligned with it. The web part 26 has a web foot 65 towards the suction side 18 and a web foot 67 towards the pressure side 19. The web foot 65 is adhered precisely with the belt 30 by means of an adhesion 60, for example made of a resin. Accordingly, a positioning device 62 is connected or aligned with the third pivot part 40. A web part 27 is fixed on the positioning device 62 via suction elements 44. The web part 27 has web feet 64 and 66. The web foot 65 is connected with the belt 31 via an adhesion 61. A precise alignment of the web part 27 with the belt 31 and the shell segment 33 is also possible here.

Figure 4:
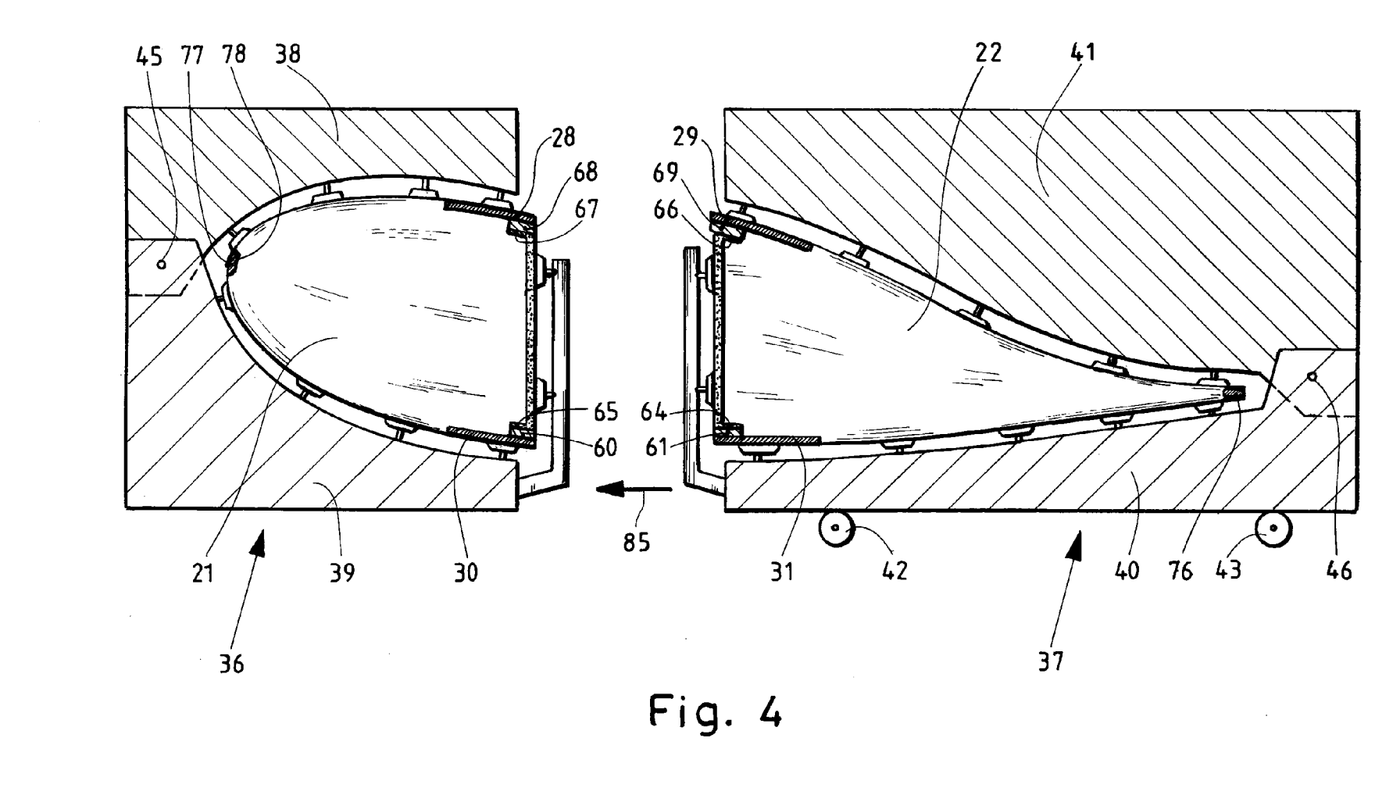

Subsequently, as shown in FIG. 4, the first pivot part 38 is pivoted around the pivot axis 45 so that an adhesion 68 of the web foot 67 with the belt 28 can take place. This can also be done in a precise manner. Furthermore, an adhesion 77 of the shell segment 32 with the shell segment 34 is realized via an adhesion part 78 connected with the shell segment 34 in the nose area of the nose box 21.

In order to produce an end box 22, the fourth pivot part 41 is pivoted around the pivot axis 46 and the web foot 66 is adhered with a glue 69 with the belt 29 so that a precise adhesion takes place between the web 27 and the belt 29 or respectively the shell segment 35. The trailing edge of the rotor blade is also connected correspondingly via an adhesion 76.

The joining devices 36 and 37 preferably have, in addition to the pivot axes 45 and 46, a linear motion device (not shown), with which the molded parts 38 and 39 or respectively 40 and 41, that is the corresponding pivot parts 38 through 41, can be closed in a straight-line movement.

As shown by arrow 85, the joining device 37 provided with the wheels 42 and 43 is subsequently moved in the direction of the joining device 36, namely after a hardening of the adhesions 60, 68, 77, 61, 69 and 76 and after a removal of the positioning devices 62 and 63.

Figure 5:
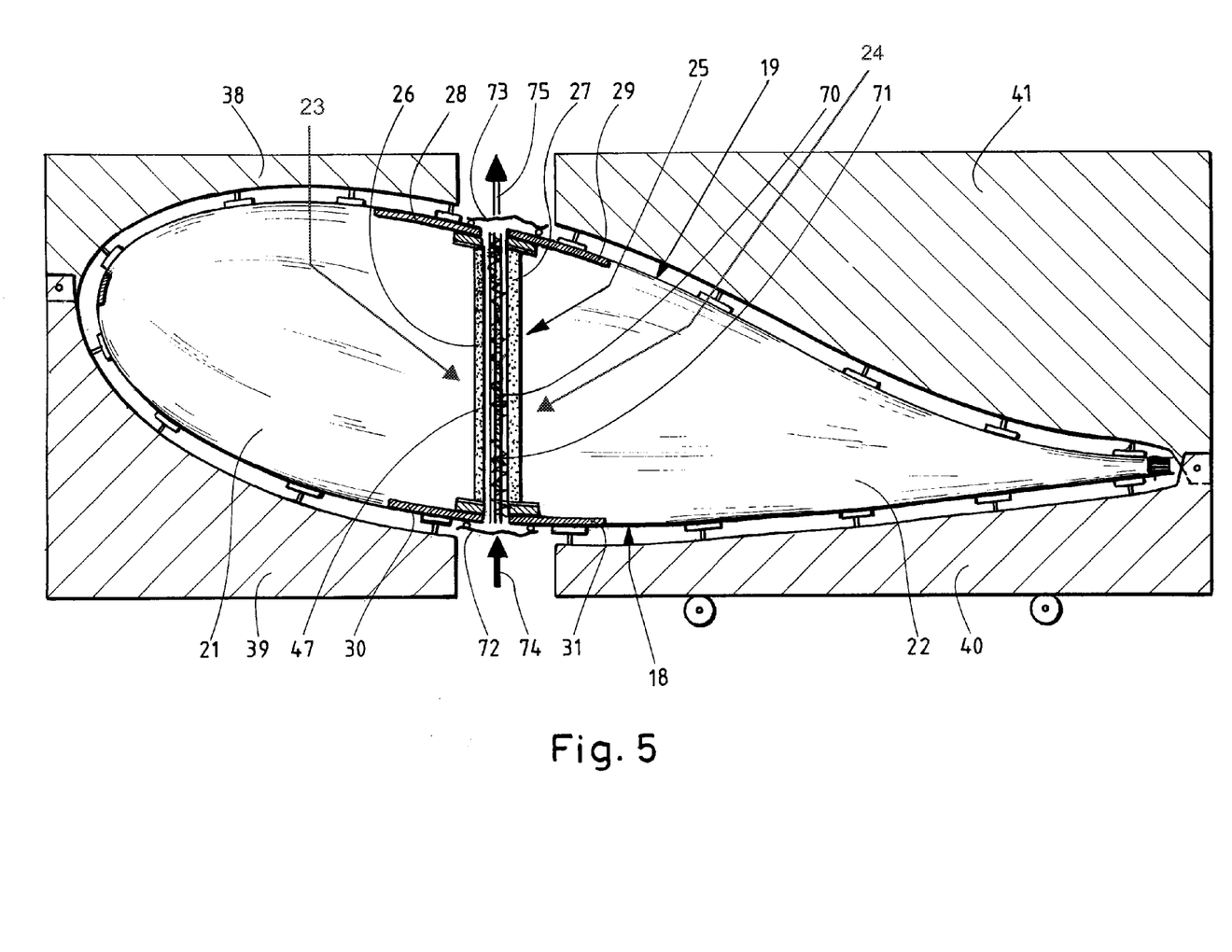

As represented schematically in FIG. 5, a glue gap results between the web parts 26 and 27. Therein, a flow medium, for example a glass fiber entanglement 70, is provided. This can be one or more layers of continuous mat, glass fabric, glass cloth or a spun material compressible in the thickness direction. The glue gap is preferably sealed vacuum-tight all around. Seals 72 and 73 are provided for this, which can be realized as vacuum film or as a solid sealing surface. Corresponding rubber seals, which do not have reference numbers, are also indicated.

A resin sprue 74 is indicated on the bottom end of the glue gap and a vacuum connection 75 on the top end. When establishing negative pressure or respectively vacuum, a gluing medium in the form of, for example resin 71, is suctioned into the glue gap through the sprue so that the gap is completely filled. The leading and trailing web or respectively the web parts 26 and 27 hereby result in a web, which can also be called the middle web, which is located in the middle of the belts 28, 29 and 30, 31. It can be seen that the belts 28 and 29 have a distance from each other and the belts 30 and 31 have a corresponding distance from each other. The gluing medium can be an infusion resin or a low-viscosity adhesive resin. The arrangement of sprue 74 or respectively resin sprue 74 and vacuum connection 75 can also be interchanged.

Over the longitudinal extension of the rotor blade 10, more sprues may be necessary under certain circumstances. Accordingly, several vacuum connections can also be provided. In particular when the blade length is relatively long, for example around 60 m.

The arrangement of the rotor blade 10 or respectively the rotor blade shell segments 32-35 with the suction side elements facing downward is not absolutely necessary. It can also be positioned the other way round.

After the resin sprue, for an aerodynamically sensible connection and for closing the gap between the belt parts or respectively the belt pairs 28, 29 and 30, 31, this gap can be closed flush with a resin and, if applicable, also with a glass fiber entanglement or the like.

The web parts 26 and 27 can be made for example of biaxial fabric, i.e. of glass fiber or carbon fiber or respectively aramid fiber fabric or comprise them. The fabrics have orientations of $\pm 20°$ to $\pm 50°$ and lie in particular in a range of $\pm 30°$ to $\pm 45°$. Towards the inside, i.e. towards the glass fiber entanglement 70, a layer of fabric, in particular biaxial fabric, can be provided and, for example, four layers of biaxial fabric in the area of the rotor blade root 12 can be provided on the outer surface and a layer of biaxial fabric in the area of the rotor blade tip 13. The distance of the web parts 26 and 27 preferably lies in a range between 1 mm and 20 mm, in particular preferably between 2 mm and 3 mm.

In order to achieve a sufficient buckling resistance of the produced rotor blade 10, the blade can also have a trailing edge web outside the area of the I beam 25, which results from the adhesion of the web parts 26, 27 with the belts 28, 29 and 30, 31. The trailing edge web is preferably arranged in the end box 22 and can be arranged there on the suction side and/or on the pressure side and reaches, for example, in the case of a 61 m blade from approx. 8 m to 52 m calculated from the rotor blade root 12.

Figure 6:
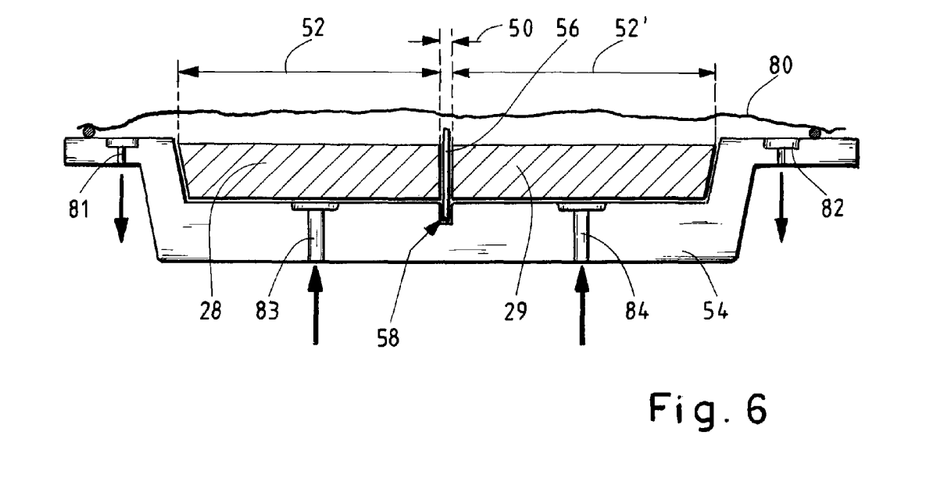
Figure 7:
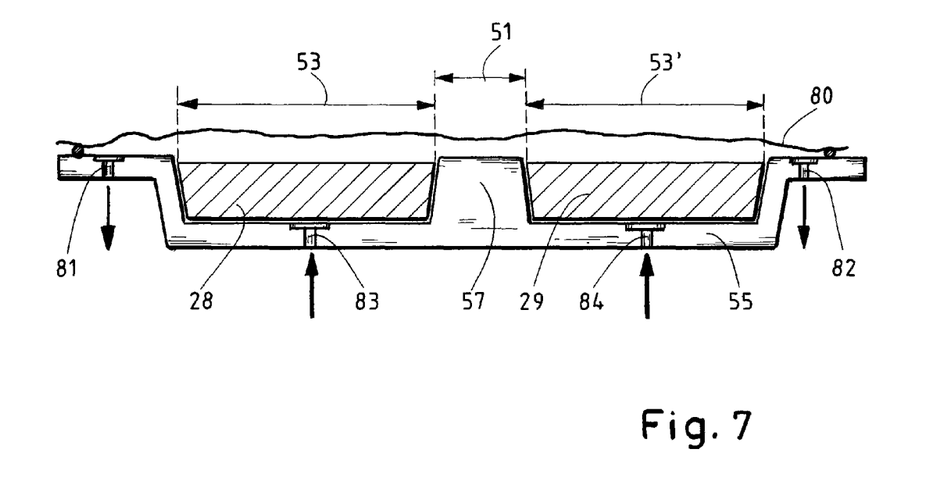

The joining device 36, 37 is preferably used since the occupancy time of the rotor blade production mold is thus reduced. The four shell segments 32 through 35 are correspondingly aligned in the pivot parts 38 through 41. The adhesion of the web parts 26 and 27 takes place in particular two-dimensionally. The particularly exact positioning and alignment of the shell segments 32 through 35 and the web parts 26 and 27 preferably takes place through the positioning device indicated in FIGS. 1 through 5, which are represented as suction elements 44 and are preferably adjustable in height or respectively distance to the pivot parts. The very large mold accuracy is thereby achieved in that the belts or respectively belt parts 28, 29 and 30, 31 are each produced together, that is the belts 28 and 29 together and the belts 30 and 31 together in one fabrication mold. For this, schematic sectional representations of corresponding fabrication molds, in which the corresponding belts 28 and 29, which serve as examples here, are fabricated, are shown in FIGS. 6 and 7.

In the fabrication molds 54 and 55, two cavities for the belts 28 and 29 to be produced, which are divided in the middle, are correspondingly provided. In the exemplary embodiment according to FIG. 6, the division takes place through a middle web 56 insertable in a recess 58 and in the exemplary embodiment according to FIG. 7 through a middle web 57 fabricated as one piece with the fabrication mold 55.

Dry glass fibers are laid into the mold and immersed through a resin sprue 74 in the cavities with a resin 71. Through the fixed mold division or respectively the production of the two belts 28 and 29 in one single mold, the two belts 28 and 29 always fit together perfectly. Both belts have an identical curvature and twist, which corresponds with the rotor blade 10 to be fabricated in the area of the respective belts. The fabrication of the belts 28 and 29 occurs in the exemplary embodiments according to FIGS. 6 and 7 preferably with a vacuum-supported infusion technique, for which resin sprue connections 83 and 84 and vacuum connections 81 and 82 are provided. A vacuum film 80 is provided for sealing, which is connected left and right in the FIGS. 6 and 7 with sealing strips, which have no reference number and, for example, can be designed as rubber lips, with the fabrication molds 54 or respectively 55. After fabrication, the belt 28 has an extension 52 and the belt 29 an extension 52' according to the embodiment according to FIG. 6 and in FIG. 7 the belt 28 has an extension 53 and the belt 29 an extension 53'. Accordingly, the distance 50 in the case of the use of a middle web 56 according to FIG. 6 is smaller than in the case of a middle web 51 according to FIG. 7, since the middle web 51 in FIG. 7 is sloped or respectively beveled.

In the case of the embodiment according to FIG. 6, both belts 28, 29 are demolded from the fabrication mold 54 together and the parting strip is subsequently removed. Smaller alignment errors of the parting strip can hereby occur, which are however insignificant, since the two belt halves are always designed complementarily, i.e. substantially uniformly. The embodiment according to FIG. 7 enables lower tolerances of the belts 28, 29 or respectively a lower tolerance or respectively differences in the distance 51 in the longitudinal extension of the rotor blade, but leads to greater distances 51 and thus to greater glue gaps between the web parts 25 and 26 in FIG. 5. The distance of the web parts 25 and 26 can then lie in the range of 10 mm or more.

The joint fabrication of two belts in one fabrication mold saves production space and time during fabrication. Moreover, belts produced in this manner, which are then used in the longitudinal extension of the rotor blade on a pressure side or a suction side, also instead of a web, which connects the belts and which is adhered in the middle, i.e. a double web, for example in a connection by means of a box spar according to patent application DE 10 2008 038 620.0, can be used.

A controllable, process-secure and accessible web-to-shell adhesion is possible through the invention. High forces can be transferred through a large-area middle web adhesion or respectively web adhesion, through which an I-beam forms. It is also not necessary to use an external pressing force to displace the glue, since the web parts 26 and 27 are pressed onto each other through the supplied vacuum. The web parts are resilient to tension, but are relatively soft in themselves. Local differences in the thickness of the glue gap, that is the gap between the web parts 26 and 27, which result from tolerances in the adhesive surfaces or respectively of the web surfaces, are leveled out to the thickness of the flow medium through the vacuum. The flow medium also ensures the resin flow through the pressed-together surfaces. This is not visible on the fabricated blade.

Figure 8:
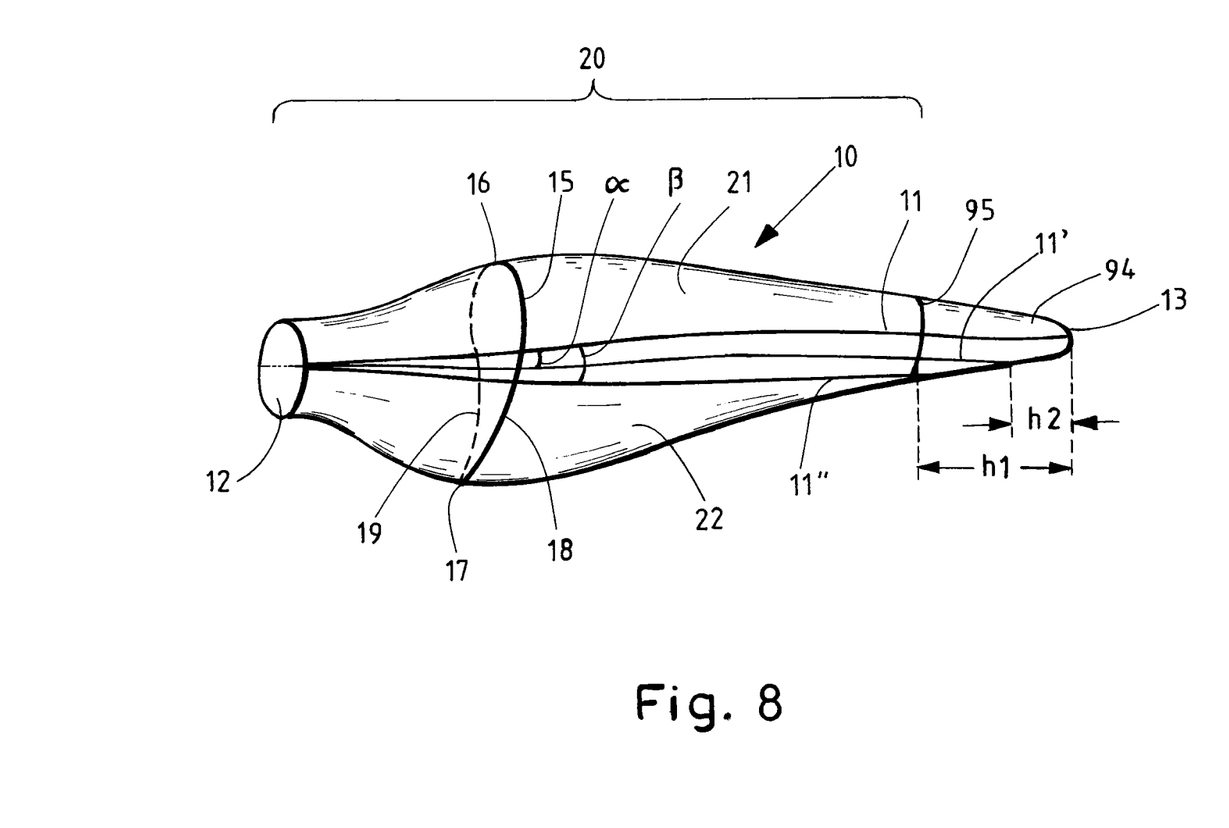

FIG. 8 shows a schematically represented rotor blade 10 according to the invention. In the case of this rotor blade, a longitudinal division of the rotor blade 10 into rotor blade sections 21 and 22 is provided, wherein the division takes place along a longitudinal extension 11 or respectively 11' or 11". The longitudinal extension 11 goes from the rotor blade root to the rotor blade tip 13. The longitudinal extension 11' runs from the rotor blade root substantially to the rotor blade tip 13 and ends in the area of the rotor blade tip 13 at a distance h2 from this tip. Accordingly, in the case of a distribution in the longitudinal extension 11", it can go up to an edge in the area of the rotor blade tip 13, which shows a connection edge 95 between a prefabricated rotor blade tip and the rest of the rotor blade or respectively rotor blade section 20. In this case for example, the rotor blade tip does not have to be divided in the longitudinal extension.

The distance to the connection edge 95 is specified with h1. It can be up to 5 m. However, a distance of a few centimeters can also be provided. As mentioned above, the rotor blade tip section 94 can be prefabricated separately. Accordingly, angle α and β to longitudinal extension 11' or respectively longitudinal extension 11" can be provided between the longitudinal extension 11 between the rotor blade root 12 and the rotor blade tip 13. α can lie, for example, in the range from 0.1 to 2° and β in the range from 2° to 5°.

Figure 9:
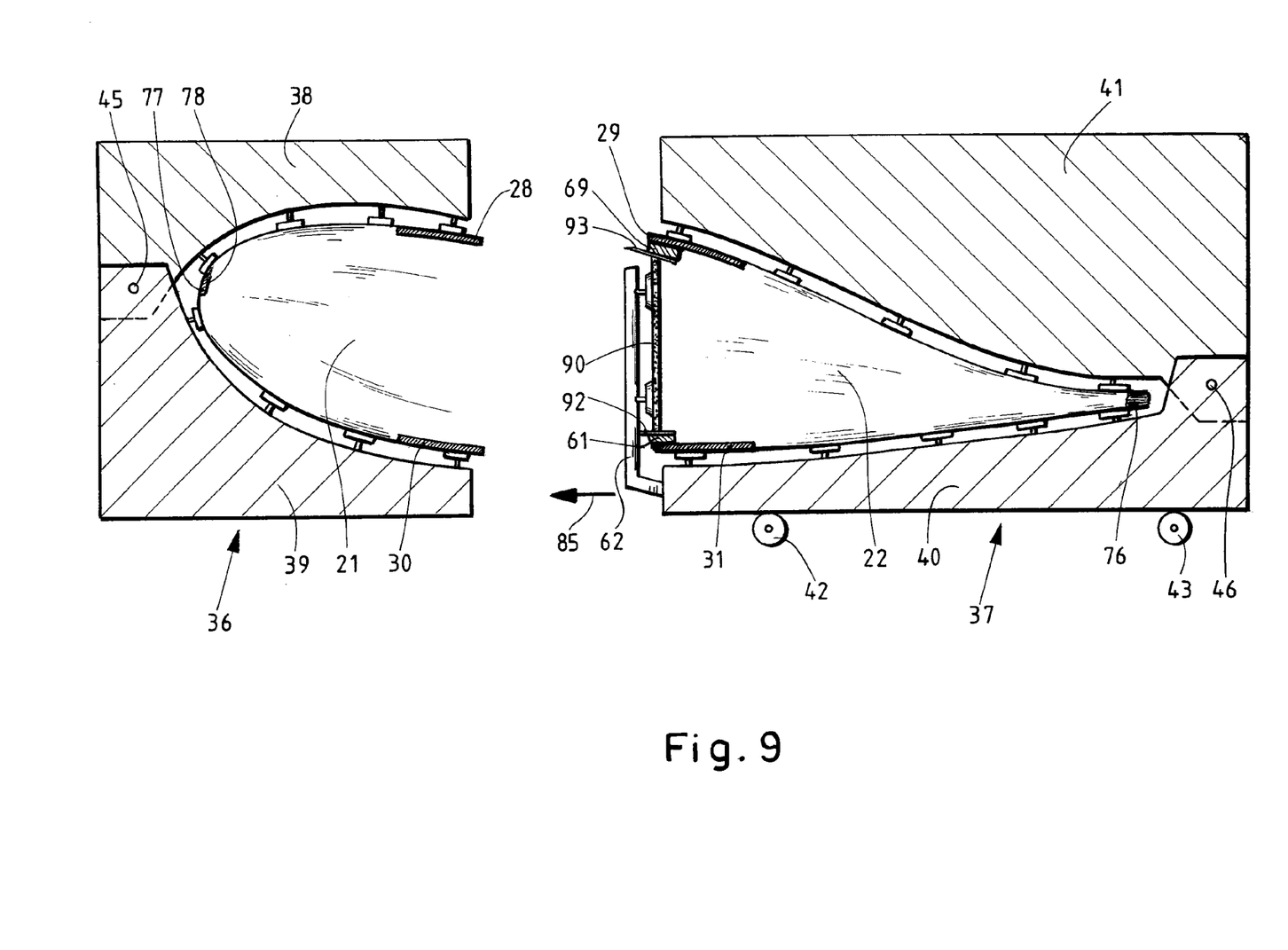

FIG. 9 shows a schematic sectional representation through the fabrication device, in which corresponding rotor blade sections are already inserted, wherein in this case in the trailing rotor blade section 22, i.e. in the end box, a web 90 is glued in, which has web feet 92 and 93, each of which overlap to the left and right and are adhered to the belts 29 and 31 with corresponding adhesions 69 and 61. The protruding parts of the web feet 92 and 93 are then adhered to the belts 28 and 30 after the removal of the positioning device 62 and the pushing together of the rotor blade sections in the direction of the arrow 85.

Figure 10:
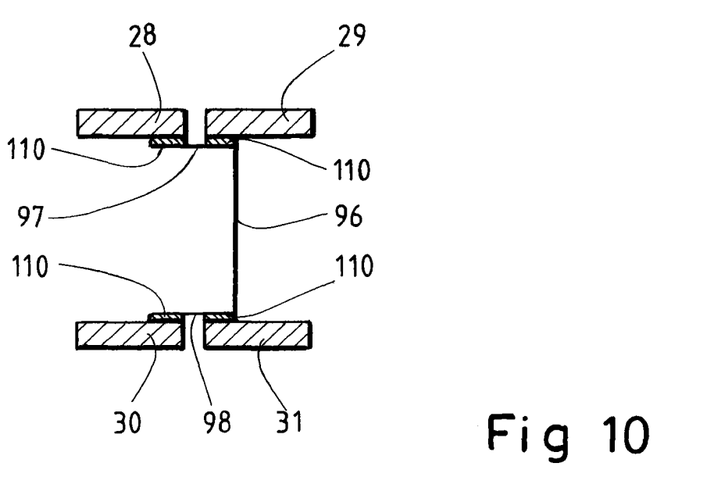
Figure 11:
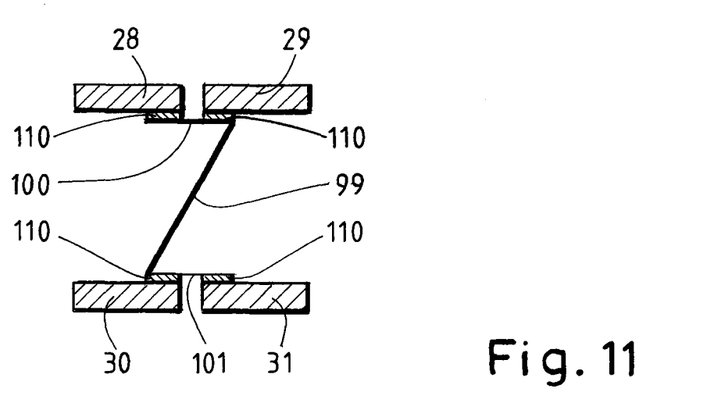

FIG. 10 and FIG. 11 show further schematic cross-sectional representations of connection options of rotor blade sections, which are not shown here. The belts 29 through 31, which are adhered with corresponding adhesions 110 to the respective web feet 97 and 98 of the web 96, are represented. The web 96 has the shape of a square bracket or respectively of a square C. The web feet 97 and 98 protrude beyond the distance of the belts 28 and 29 or respectively 30 and 31.

Accordingly, FIG. 11 shows a connection, in which a web 99 is provided that is Z-shaped. Accordingly, the web feet 100 and 101 are adhered to the belts 28 and 29 or respectively 30 and 31 through adhesions 110.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

REFERENCE NUMBER LIST

10 Rotor blade
11, 11', 11" Longitudinal extension
12 Rotor blade root
13 Rotor blade tip
14 Aerodynamic area
15 Cross-sectional profile
16 Leading edge
17 Trailing edge
18 Suction side
19 Pressure side
20 Section
21 Nose box
22 End box
23 Trailing area
24 Leading area
25 I-beam
26 Web part
27 Web part
28 Belt
29 Belt
30 Belt
31 Belt
32 Shell segment
33 Shell segment
34 Shell segment
35 Shell segment
36 Joining device
37 Joining device
38 First pivot part
39 Second pivot part
40 Third pivot part
41 Fourth pivot part
42 Wheel
43 Wheel
44 Suction element
45 Pivot axis
46 Pivot axis
47 Double web
50 Distance
51 Distance
52, 52' Extension
53, 53' Extension
54 Fabrication mold
55 Fabrication mold
56 Middle web
57 Middle web
58 Recess
60 Adhesion
61 Adhesion
62 Positioning device
63 Positioning device
64-67 Web foot
68 Adhesion
69 Adhesion
70 Glass fiber entanglement
71 Resin
72 Seal
73 Seal
74 Resin sprue
75 Vacuum connection
76 Adhesion
77 Adhesion
78 Adhesion part
80 Vacuum film
81 Vacuum connection
82 Vacuum connection
83 Resin sprue connection
84 Resin sprue connection
85 Arrow
90 Web
91 Web
92 Web foot
93 Web foot
94 Rotor blade tip section
95 Connection edge
96 Web
97 Web foot
98 Web foot
99 Web
100 Web foot
101 Web foot
110 Adhesion
h1 Distance
h2 Distance
α Angle
β Angle

The invention claimed is:

1. A rotor blade (10) of a wind power plant, wherein the rotor blade (10) comprises:
a longitudinal extension (11), which extends from a rotor blade root (12) substantially to a rotor blade tip (13),
wherein, at least in one region of the rotor blade (10), an aerodynamic cross-sectional profile (15) is provided, which has a leading edge (16) and a trailing edge (17), which are connected via a suction side (18) and a pressure side (19) of the cross-sectional profile (15),
wherein the rotor blade (10) is subdivided at least in a longitudinally extended section (20) into a front rotor blade section (21) with the leading edge (16) and a rear rotor blade section (22) with the trailing edge (17),
wherein the rear region (23) of the front rotor blade section (21) and the adjacent front region (24) of the rear rotor blade section (22) are connected by an I-beam (25), and
wherein a belt (28-31) divided in the longitudinal extension (11) of the rotor blade (10) is provided, the belt parts (28, 29; 30, 31) of which have a distance (50, 51) from each other, which is smaller than the extension (52, 52', 53, 53') of a belt part (28, 29; 30, 31) in the direction from the leading edge (16) to the trailing edge (17).

2. The rotor blade (10) according to claim 1, wherein the I-beam (25) has a web (26, 27, 90, 91, 96, 99), which extends within the rotor blade (10) from the pressure side (19) to the suction side (18), and the belt (28, 29) on the pressure side (19) as well as the belt (30, 31) on the suction side (18).

3. The rotor blade (10) according to claim 2, wherein the web (26, 27, 90, 91, 96, 99) comprises web feet (64-67, 92, 93, 97, 98, 100, 101), which form with the web (26, 27, 90, 91, 96, 99) a shape of a square bracket or a shape of a Z.

4. The rotor blade (10) according to claim 1, wherein the I-beam (25) has I-beam parts (26-31), which comprise a web (26, 27, 90, 91, 96, 99), wherein the I-beam (25) is divided in the longitudinal extension (11) and two-dimensionally, in a plane, which is defined by the web (26, 27, 90, 91, 96, 99).

5. The rotor blade (10) according to claim 4, wherein the I-beam parts (26, 27) are connected with each other.

6. The rotor blade (10) according to claim 1, wherein the belts (28-31) respectively close the I-beam (25) to the suction side (18) and to the pressure side (19), which have a distance from each other, which is smaller than the extension of the belts (28-31) in the direction from the leading edge (16) to the trailing edge (17).

7. The rotor blade (10) according to claim 1, wherein the rotor blade (10) is divided additionally at the leading edge (16) and/or the trailing edge (17).

8. The rotor blade (10) according to claim 1, wherein a web (26, 27, 90, 91, 96, 99) is connected with the belt parts (28, 29; 30, 31), which extends from the suction side (18) to the pressure side (19) so that the web (26, 27, 90, 91, 96, 99) forms an I-beam (25) with the belt parts (28, 29; 30, 31).

9. A method for fabricating a rotor blade (10) of a wind power plant, wherein the fabricated rotor blade (10) in its longitudinal extension (11), which extends from a rotor blade root (12) substantially to a rotor blade tip (13), has at least one region (14), in which the rotor blade (10) has an aerodynamic cross-sectional profile (15), which has a leading edge (16) and a trailing edge (17), which are connected via a suction side (18) and a pressure side (19) of the cross-sectional profile (15), comprising the following method steps:

providing at least two rotor blade sections (21, 22) fabricated and divided in the longitudinal direction (11) of the rotor blade (10), wherein the division is arranged between the leading edge (16) and the trailing edge (17), applying or inserting of a first web part (26) extending substantially from the pressure side (19) to the suction side (18) into a first divided rotor blade section (21) and a second web part (27) extending substantially from the pressure side (19) to the suction side (18) into a second divided rotor blade section (22) and connecting the first web part (26) with the second web part (27) so that a double web (47) forms.

10. The method according to claim 9, wherein the application or insertion of the first and of the second web part (26, 27) comprises a connection of the first and second web part (26, 27) to one belt (28, 29) respectively on the pressure side (19) and one belt (30, 31) on the suction side (18) per rotor blade section (21, 22).

11. The method according to claim 10, wherein an I-beam (25), comprising four belts (28-31) and a double web (47), forms through the connection of the first web part (26) with the second web part (27).

12. The method according to claim 9, wherein for the provision of two rotor blade sections (21, 22) fabricated and divided in the longitudinal extension (11) of the rotor blade (10) at least for one rotor blade section (21, 22), a suction side section (32, 33) and a pressure side section (34, 35) are connected with each other.

13. The method according to claim 9, wherein the two rotor blade sections (32-35) form a nose box (21) and/or an end box (22).

14. The method according to claim 9, wherein for the provision of two rotor blade sections (21, 22) fabricated and divided in the longitudinal extension (11) of the rotor blade (10), one belt (28-31) is respectively connected with a suction side (18) and a pressure side (19) of each rotor blade section (21, 22).

* * * * *